Feb. 6, 1945. H. P. BINGENHEIMER 2,368,800
JUICE EXTRACTING APPARATUS
Filed June 23, 1943 3 Sheets-Sheet 1

Inventor
Harry P. Bingenheimer
By Cushman, Darby & Cushman
Attorneys

Feb. 6, 1945.  H. P. BINGENHEIMER  2,368,800
JUICE EXTRACTING APPARATUS
Filed June 23, 1943   3 Sheets-Sheet 2
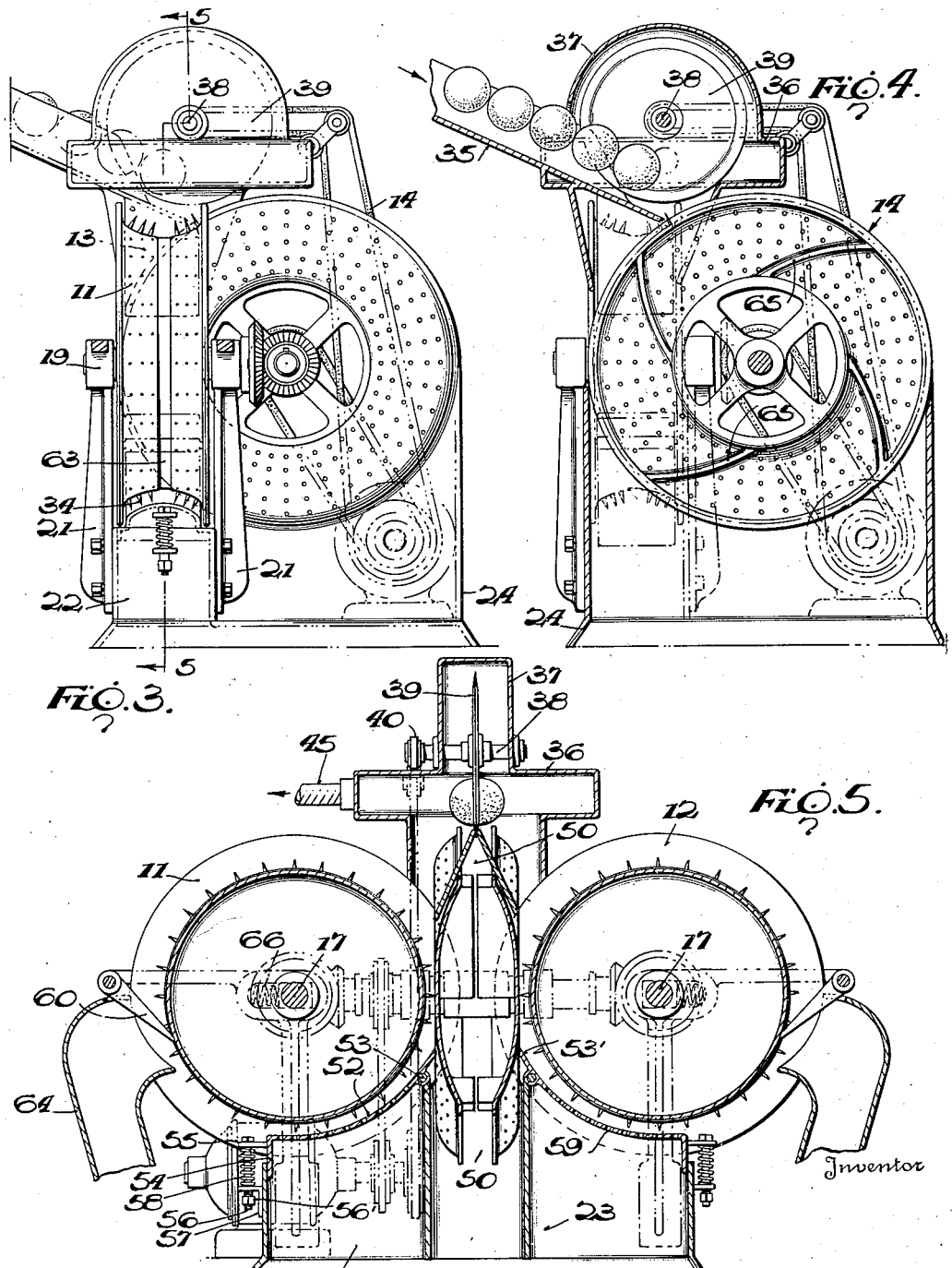
Inventor
Harry P. Bingenheimer
By Cushman, Darby Cushman
Attorneys Feb. 6, 1945. H. P. BINGENHEIMER 2,368,800
JUICE EXTRACTING APPARATUS
Filed June 23, 1943 3 Sheets-Sheet 3

Inventor
Harry P. Bingenheimer
By Cushman, Darby & Cushman
Attorneys

Patented Feb. 6, 1945

2,368,800

UNITED STATES PATENT OFFICE 2,368,800

JUICE EXTRACTING APPARATUS

Harry Philip Bingenheimer, Jacksonville, Fla.

Application June 23, 1943, Serial No. 491,990

21 Claims. (Cl. 146—3)

The present invention relates to juice extracting apparatus and particularly to apparatus for extracting juice from citrus fruits, such as oranges, grapefruit, lemons, or the like.

An object of the invention is the provision of extracting mechanism including cooperating rotating elements acting upon fruit halves whereby progressively increasing pressure is applied to extract the juice.

A further object is to provide an apparatus including a pair of spaced aligned feed wheels having continuous pockets formed in their peripheries, and a rotatable member having a pair of spaced annular fruit-pressing sections mounted at substantially right angles to the feed wheels, and each engageable with the pocket of one of the feed wheels to press the fruit halves. With this arrangement, the fruit is placed under progressively increasing pressure as it is fed between the wheels and annular sections.

Another object is the provision of means for rotating the feed wheels at a different speed from the annular sections whereby a tearing action is developed in addition to the pressing action.

A still further object is to provide the annular sections with perforations to permit the discharge of juice therethrough and then through the opening formed between said sections into a suitable tank or container.

Another object is the provision of means for feeding fruit to a knife which severs it into halves and then guides the halves to opposite sides, whereby each half is acted upon by its respective feed wheel and annular section.

A further object is to provide a casing surrounding the knife or fruit severing mechanism, said casing having associated therewith air exhausting means adapted to remove peel oil or vapor laden air expelled by the cutting action of the knife, so that it cannot mix with the fruit juice as it is being extracted by the feed wheels and annular members.

A further object is to provide means for acting upon the fruit halves after they have been carried past the annular sections, to thereby effect a final pressing action. Thereafter, means are provided to remove the pressed or crushed skins from the feed wheels so that they will not travel around with the wheels and interfere with the new halves as they are being fed to the wheels and annular sections.

With the foregoing and other objects in view, the invention will now be more fully described, reference being had to the accompanying drawings, in which:—

Figure 3 is an end elevation;

Figure 4 is a section on line 4—4 of Figure 1;

Figure 5 is a vertical section on line 5—5 of Figure 3;

Figure 1:
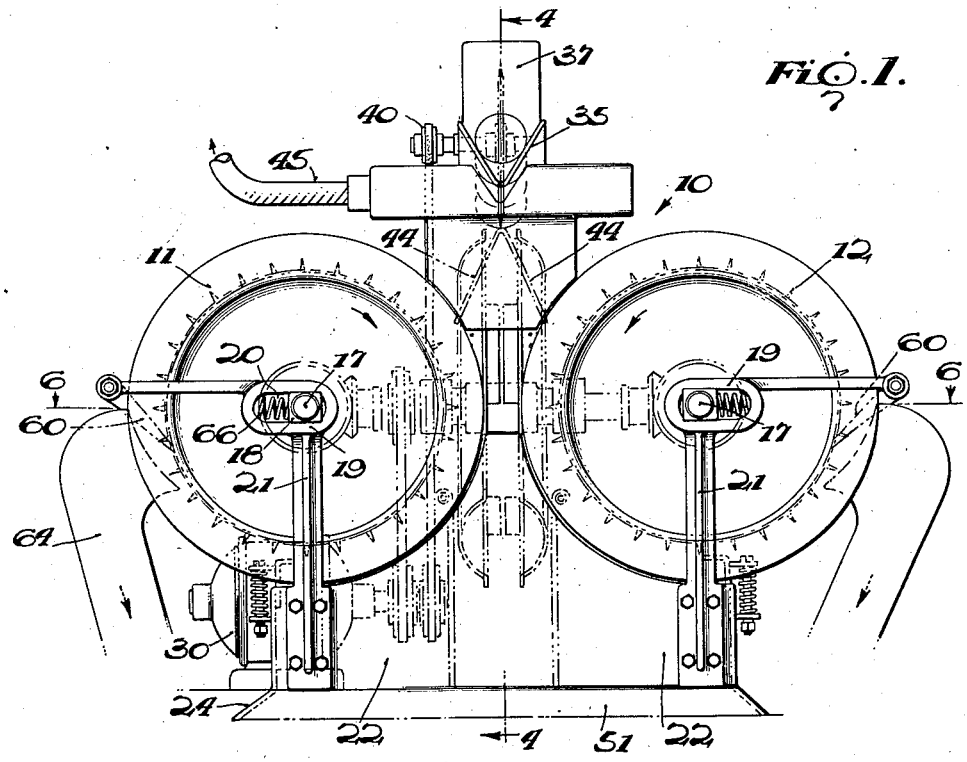
Figure 1 is a side elevation of the juice extracting apparatus.
Figure 6:
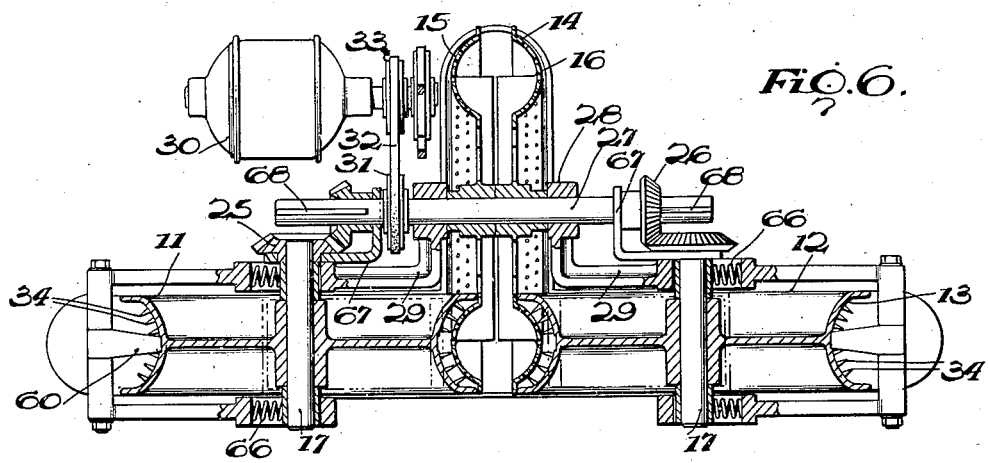
Figure 6 is a horizontal section on line 6—6 of Figure 1.
Figure 7:
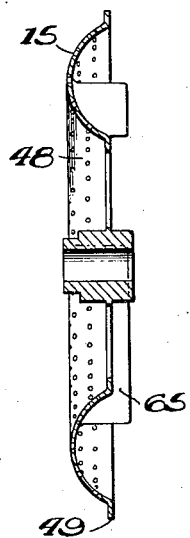
Figures 7, 8 and 9 are detailed views of the fruit-pressing member.
Figure 8:
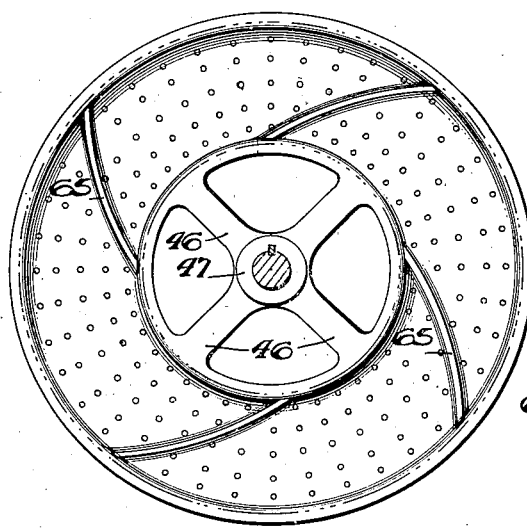
Figure 9:
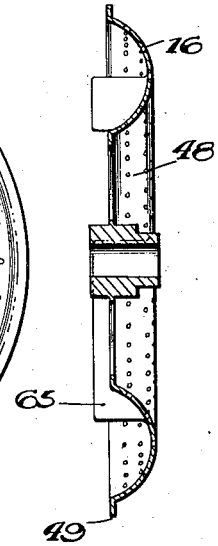

Referring now to the drawings and particularly to Figures 1, 5 and 6, the numeral 10 designates generally the present apparatus comprising a pair of aligned feed wheels 11 and 12 having their peripheral portions mounted in spaced relation to each other and each feed wheel having a continuous peripheral fruit-receiving recess or pocket 13 substantially semi-circular in cross section. Cooperating with the feed wheels 11 and 12 is a rotatable member 14 having a pair of spaced annular fruit-pressing sections 15 and 16, each section being substantially semi-circular in cross section (see Figure 6). The member 14 rotates on an axis substantially at right angles to the axes of the feed wheels 11 and 12. Furthermore, this member is centrally disposed with respect to the feed wheels and is positioned partially to one side of the wheels so that the annular fruit-pressing sections 15 and 16 pass within the concave peripheries of the feed wheels and cooperate therewith to press the fruit and extract the juice therefrom as will be hereinafter described in detail (see Figures 1 and 6).

The feed wheels 11 and 12 and the member 14 may be supported and mounted for rotation in any desired manner, the main requisite being that the feed wheels be rotated toward each other as designated by the arrows in Figure 1, and that the member 14 also be rotated in the same direction as the feed wheels. As shown particularly in Figures 1, 2 and 6, each feed wheel is mounted on a horizontally disposed shaft 17 journaled in suitable bearing blocks 18. Each block is mounted in a bearing supporting element 19 having an elongated opening 20 to permit the bearing to be adjustably mounted therein for a purpose to be hereinafter described. The elements 19 are formed integral with upstanding posts 21 which are secured to spaced side plates 22 forming walls of auxiliary juice-receiving compartments 23 (see Figures 3 and 5). These compartments cooperate to form part of the frame structure 24 of the apparatus. This frame 24 is not disclosed in detail, but it is to be understood that it adequately supports the feed wheels 11 and 12, the member 14 and the fruit-feeding means which will be described in greater detail hereinafter.

Referring again to Figures 2 and 6, each shaft 17 has mounted thereon a bevel gear 25 which meshes with a cooperating bevel gear 26. The gears 26 are mounted adjacent opposite ends of shaft 27. This shaft is mounted at right angles to the shafts 17 and rotatably supports the member 14 carrying the annular fruit-pressing sections 15 and 16. The bearings 28 in which the shaft 27 is journaled are connected to the bearing supporting elements 19 by means of angle pieces 29. Power for rotating the shafts 17 and 27 is derived from a motor 30 through gearing comprising pulleys or wheels 31, 33 and belt 32.

It will be observed that the particular arrangement and construction of the feed wheels and sections 15 and 16 is such as to receive a plurality of sections of half fruit and to press the same so as to extract substantially all of the juice therefrom. The concave peripheral portion of each feed wheel is provided with a plurality of fruit impaling studs 34 for positioning and retaining the half fruit portions in their respective pocket 13, with the opening face of each fruit portion exposed to its annular section of the member 14. Thus, as the feed wheels 11 and 12 and member 14 are rotated toward each other, each annular section 15, 16 will always have a portion thereof rotating within the concave periphery 13 of its respective feed wheel. The fruit feeding means, which will be described in greater detail hereinafter, feeds the half fruits in such a manner that each severed half fruit will slide into the pocket of its respective feed wheel. Thereafter, by the continued rotation of the feed wheels and member, the fruit halves will come into contact with one of the annular sections of the member 14 and will be gradually compressed by the same so as to extract substantially all of the juice therefrom. The greatest point of compression will be on a line in substantially the same plane as the axes of the feed wheels and member.

In addition to effecting the gradually increased pressing action on the fruit halves, means are provided to effect a cooperating tearing action on the fruit as it is being pressed or squeezed. This is accomplished by rotating the sections 15 and 16 at a greater speed than the feed wheels 11 and 12. It will be observed that the bevel gears 25 are larger in diameter than the gears 26. Thus, the member 14 is rotated at a greater speed than the feed wheels 11 and 12 to effect this combined pressing and tearing action. In view of the fact that the fruit halves are held in position in the peripheral recess or pocket 13 of their respective feed wheel, the increased surface speed of the respective pressing section will have the effect of imparting a substantially semicircular or twisting motion somewhat like hand reaming and thus serves to present the fruit cells to a continued pressing action which facilitates releasing the juice from the fruit cells.

The fruit, which may be oranges, grapefruit, or the like, is fed by gravity to the feed wheels by means of a substantially inclined V-shaped trough 35. The lower end of this trough projects into a casing 36 having a substantially semicircular section 37 within which is journaled a knife supporting shaft 38. A disc knife 39 is fixed to the shaft and rotates therewith to slice the fruit into halves as they travel down the trough. It will be observed (see Figures 1, 2 and 5) that the knife is positioned centrally of the trough so that the fruit will be sliced into equal half portions. One end of the shaft 38 extends through the casing 36 and has connected thereto a pulley or wheel 40. A pulley or wheel 41 is mounted on the motor shaft 42 to one side of the wheel 32 and transmits power to the shaft 38 and wheel 40 by means of belt gearing 43. If desired, sprocket gearing may be substituted.

As soon as the fruit is severed into halves by the knife 39, each half is adapted to slide down one of a pair of inclined plates 44. These plates are so positioned with respect to the lower end of the trough 35 and the feed wheels 11 and 12 that the two fruit halves which have been severed by the knife 39 are directed into their respective recesses or pockets 13, whereupon they are moved with the wheels into contact with the annular pressing sections 15 and 16.

The cutting of the fruit peels during the severing operation usually releases peel oil or vapor which ordinarily would be expelled into the air in the knife chamber and penetrate to the feed wheels and possibly commingle with the fruit juices. In order to prevent this, and improve the flavor of the juices, means are provided to remove the peel oil laden air from the casing. This is accomplished by providing the casing 36 with one or more openings connected to conduits or passages 45, which are connected with any suitable suction or exhaust fan (not shown). It will be observed that the lower end of the casing 36 is extended to enclose the inclined plates 44 and thus prevent accidental displacement of the fruit halves as they are being fed to the feed wheels 11 and 12.

Referring to Figures 6 to 9, it will be observed that the member 14 is more or less in the form of a wheel and each section is provided with a plurality of spoke-like elements 46 extending outwardly from the hub or bearing 47 and connected at their outer ends to their respective fruit-pressing section. The annular fruit-pressing sections are each provided with a plurality of perforations 48, whereby the fruit juice as it is being extracted from the fruit halves is permitted to escape through the perforations into the interior of the member. The outer periphery of each section is provided with an annular flange 49 which is spaced from its corresponding flange to form an annular opening 50 to permit the juice which has entered the sections 15 and 16 to escape and flow downwardly to be received in a tank 51 located in the lower portion of the apparatus.

In order to insure that all of the juice has been extracted from the fruit halves, additional means are provided which act upon the fruit as it is still impaled on the feed wheels 11 and 12 after it has passed out of contact with the annular sections 15 and 16. Referring particularly to Figures 3 and 5, this means comprises the aforesaid compartments 23, the upper end of each of which is provided with a curved or arcuate plate 52. Each plate is hinged at 53 to the upper portion of the compartment 23 and is provided with a down-turned flange 54 having a lug 55, through which a bolt 56 passes. Cooperating with the lug 55 is a like lug 57 mounted on the outer face of one of the walls of the compartment 23 and also having an opening through which the bolt 56 passes. A suitable coil spring 58 surrounds the bolt between the lugs 55 and 56 to thereby resiliently and adjustably retain the plate 52 in operative association with its respective feed wheel. Each plate (see Figure 3) is provided with a raised portion extending within the recess or pocket 13 of its feed wheel and so spaced from the base of the pocket that it will cooperate therewith to exert a final extracting or pressing action on the fruit as it passes by the plate. Each plate is provided with a plurality of perforations 56 whereby any juice which has not been extracted by its passage between the feed wheels and the annular sections 15 and 16, may be discharged into the compartment 23 and from there into the tank 51.

By hingedly mounting the plates 52, they can accommodate themselves to the thickness of the various skins or fruit sections by swinging away from the feed wheels, should thick-skinned fruit be fed to the machine. This leverage or spring tension may be controlled by screwing the nut 56' on the bolt 56, so that fixed pressure can be made on the plate.

It will be noted that the plate 52 is extended beyond the pivot 53 to form a somewhat sharp end 53' to fit the contour of its respective fruit pressing section, so as to prevent skins from entering at this point and possibly clogging the apparatus.

Figure 2:
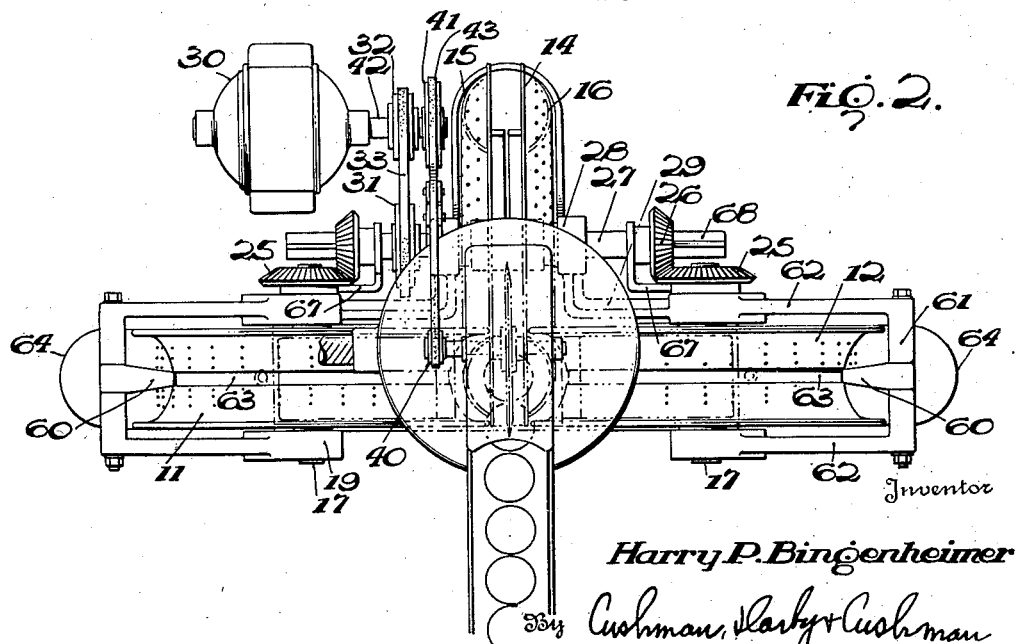
Figure 2 is a top plan view of the structure shown in Figure 1.

After the juice-extracted fruit halves have passed by the plates 52, means are provided for removing them from the feed wheels 11 and 12, so that they will not be returned and interfere with the new fruit halves as they are fed to the feed wheels. This means comprises a skin ejector finger 60 adjustably mounted on a stub shaft 61 carried by a pair of arms 62 extending outwardly from the bearing supporting element 19. Referring to Figures 2 and 3, it will be observed that the fruit impaling studs 34 terminate adjacent the center of the pocket 13 and an annular groove 63 is formed centrally of the pocket. This groove is of a width to receive the free end of the finger 60. That is, the finger rides in the groove 63, and thus as the impaled crushed skins rotate past their respective plate 52, they contact the finger 60 and are loosened and removed from the pocket 13. Discharge chutes 64 receive the ejected fruit halves and transfer them to any desirable receptacle (not shown).

Referring again to Figures 7 to 9, each annular section 15 and 16 is provided on its inner face with a plurality of curved vanes 65 which extend into the section from a point beyond the inner edge of the flange 69 and assist in removing or ejecting the juice from the interior of the member to the tank 51. Any number of these vanes may be provided as desired.

Referring again to Figures 1 and 3, the feed wheels 11 and 12 are so mounted that they may be adjusted for thick or thin-skinned fruit and so positioned that large or small fruit can be handled with equal efficiency. This is accomplished by means of the elongated openings 20 which permit the bearing blocks 18 to slide therein. In the present instance, springs 66 are mounted in the openings 20 and tend to urge the bearing blocks 18 inwardly but permit a sliding movement of the blocks and the wheels, in the event that thick-skinned fruit is being operated upon. If desired, means may be provided to positively retain the bearing blocks 18 in predetermined positions of adjustment in the slots 20.

Referring to Figures 2 and 6, it will be observed that movement of the shafts 17 in the slots 20 will also move the bevel gears 25. Furthermore, each gear 26 will always remain in mesh with its corresponding gear 25. This is accomplished by employing angle pieces 67. Each piece is formed with openings which receive the shafts 27 and 17. The arrangement is such that as each shaft 17 moves outwardly against its spring 66 it will also carry its angle piece 67. The gears 26 being slidably mounted on the shaft 27 by reason of the splines 68, it follows that each gear will be moved on shaft 27 in mesh with its corresponding gear 25, when there is a movement of its respective shaft 17 and feed wheel. Thus each set of bevel gears 25 and 26 will always remain in mesh regardless of the positions of the feed wheels.

The present construction provides a very efficient juice-extracting apparatus which will quickly and easily accommodate different types of citrus fruits. While the base of the apparatus is not disclosed in detail, it is to be understood that the entire unit is self-contained and properly supported. It is to be further understood that the invention is not limited to the details of construction shown in the drawings, and that the phraseology employed in the specification is for the purpose of description and not of limitation.

I claim:

1. A fruit juice extracting apparatus comprising a feed wheel having a continuous peripheral fruit receiving pocket, and a member rotatable about an axis at substantially right angles to the axis of said wheel, said member having an annular fruit pressing section engageable with said pocket to extract juice from fruit fed between said feed wheel and member.

2. A fruit juice extracting apparatus comprising a feed wheel having a continuous, concave periphery constituting a pocket for the reception of halves of citrus fruit, and a member rotatable about an axis at substantially right angles to the axis of said wheel, said member having an annular fruit pressing section of substantially semicircular formation in cross-section passing within the concave periphery of the feed wheel during rotation of said wheel and member and cooperating therewith to press the fruit, said annular fruit pressing section having perforations for the discharge of juice extracted by the coaction of said wheel and member.

3. A fruit juice extracting apparatus comprising a feed wheel having a continuous, concave periphery constituting a pocket for the reception of halves of citrus fruit, and a member rotatable about an axis at substantially right angles to the axis of said wheel, said member having an annular fruit pressing section of substantially semicircular formation in cross-section passing within the concave periphery of the feed wheel during rotation of said wheel and member and cooperating therewith to press the fruit, said annular fruit pressing section having perforations for the discharge of juice extracted by the coaction of said wheel and member, and means for rotating said feed wheel and member in the same direction but at different speeds to thereby effect a combined tearing and pressing action on the fruit cells.

4. A fruit juice extracting apparatus comprising a feed wheel having a continuous, concave periphery constituting a pocket for the reception of halves of citrus fruit, and a member rotatable about an axis at substantially right angles to the axis of said wheel, said member having an annular fruit pressing section of substantially semicircular formation in cross-section passing within the concave periphery of the feed wheel during rotation of said wheel and member and cooperating therewith to press the fruit, said annular fruit pressing section having perforations for the discharge of juice extracted by the coaction of said wheel and member, said wheel pocket being provided with fruit impaling studs to assist in positioning and retaining the half fruit portions in the pocket, with the open face of each fruit portion exposed to the annular section of said member.

5. A fruit juice extracting apparatus comprising a feed wheel having a continuous, concave periphery constituting a pocket for the reception of halves of citrus fruit, and a member rotatable about an axis at substantially right angles to the axis of said wheel, said member having an annular fruit pressing section of substantially semi-circular formation in cross-section passing within the concave periphery of the feed wheel during rotation of said wheel and member and cooperating therewith to press the fruit, said annular fruit pressing section having perforations for the discharge of juice extracted by the coaction of said wheel and member, said wheel pocket being provided with fruit impaling studs to assist in positioning and retaining the half fruit portions in the pocket, with the open face of each fruit portion exposed to the annular section of said member, and means for rotating said feed wheel in the same direction as said member but at a slower speed to thereby effect a combined tearing and pressing action on the fruit cells.

6. A fruit juice extracting apparatus comprising a pair of aligned feed wheels having their peripheral portions mounted in spaced relation to each other, each wheel having a peripheral fruit receiving pocket, and a member rotatable about an axis at substantially right angles to those of said feed wheels and having a pair of annular fruit pressing sections, each section being so positioned relative to one of the feed wheels that it passes within the peripheral pocket of said feed wheel and cooperates therewith to effect a pressing action on the fruit.

7. A fruit juice extracting apparatus comprising a pair of aligned feed wheels having their peripheral portions mounted in spaced relation to each other, each wheel having a peripheral fruit receiving pocket, and a member rotatable about an axis at substantially right angles to those of said feed wheels and having a pair of spaced annular fruit pressing sections mounted to rotate as a unit, each section being so positioned relative to one of the feed wheels that it passes within the peripheral pocket of said feed wheel and cooperates therewith to effect a pressing action on the fruit, said annular fruit pressing sections having perforations to permit discharge of the juice therethrough and through the opening formed by the spacing of said sections.

8. A fruit juice extracting apparatus comprising a pair of aligned feed wheels having their peripheral portions mounted in spaced relation to each other, each wheel having a continuous concave periphery constituting a pocket for the reception of halves of citrus fruit, and a member rotatable about an axis at substantially right angles to those of said feed wheels and having a pair of spaced annular fruit pressing sections, each section being of substantially semi-circular formation in cross-section, with the open portions of said sections facing each other, each section passing within the concave periphery of one of the feed wheels during rotation of said wheels and member and cooperating therewith to press the fruit, said annular fruit pressing sections having perforations to permit discharge of the juice therethrough and through the opening formed by the spacing of said portions.

9. A fruit juice extracting apparatus comprising a pair of aligned feed wheels having their peripheral portions mounted in spaced relation to each other, each wheel having a continuous concave periphery constituting a pocket for the reception of halves of citrus fruit, a member rotatable about an axis at substantially right angles to those of said feed wheels and having a pair of spaced annular fruit pressing sections, each section being of substantially semi-circular formation in cross-section with the open portions of said sections facing each other, each section passing within the concave periphery of one of the feed wheels during rotation of said wheels and member and cooperating therewith to press the fruit, said annular fruit pressing sections having perforations to permit discharge of the juice therethrough and through the opening formed by the spacing of said portions, and means for rotating said feed wheels in the same direction as said member but at a different speed to thereby effect a combined tearing and pressing action on the fruit cells.

10. A fruit juice extracting apparatus comprising a feed wheel having a continuous, concave periphery constituting a pocket for the reception of halves of citrus fruit, a member rotatable about an axis at substantially right angles to the axis of said wheel, said member having an annular fruit pressing section of substantially semi-circular formation in cross-section passing within the concave periphery of the feed wheel during rotation of said wheel and member and cooperating therewith to press the fruit, said annular fruit pressing section having perforations for the discharge of juice extracted by the coaction of said wheel and member, and a curved plate movably mounted below the fruit pressing area of said feed wheel and member and having a raised perforated portion projecting into the concave peripheral portion of the feed wheel and cooperating therewith to effect a final pressing operation on the fruit halves.

11. A fruit juice extracting apparatus comprising a feed wheel having a continuous concave periphery constituting a pocket for the reception of halves of citrus fruit, a member rotatable about an axis at substantially right angles to the axis of said wheel, said member having an annular fruit pressing section of substantially semi-circular formation in cross-section passing within the concave periphery of the feed wheel during rotation of said wheel and member and cooperating therewith to press the fruit, said annular fruit pressing section having perforations for the discharge of juice extracted by the coaction of said wheel and member, and a curved plate mounted below the fruit pressing area of said feed wheel and member and having a raised perforated portion projecting into the concave peripheral portion of the feed wheel and cooperating therewith to effect a final fruit pressing operation, one end of said plate being hinged, and spring means engageable with the other end of the plate to urge it into proximity with the feed wheel but permit movement of the plate away from the wheel to accommodate it to various thicknesses of fruit skins.

12. A fruit juice extracting apparatus comprising a pair of aligned feed wheels having their peripheral portions mounted in spaced relation to each other, each wheel having a peripheral fruit receiving pocket, a member rotatable about an axis at substantially right angles to those of said feed wheels and having a pair of annular fruit pressing sections, each section being so positioned relative to one of the feed wheels that it passes within the peripheral pocket of said feed wheel and cooperates therewith to effect a pressing action on the fruit, means for feeding fruit to said wheels and members, said means comprising an inclined trough having its lower end terminating between the feed wheels, means for severing the fruit into halves, and a pair of oppositely inclined plates associated with the lower end of the trough, each plate adapted to guide a fruit half to the pocket of its respective feed wheel.

13. A fruit juice extracting apparatus comprising a pair of aligned feed wheels having their peripheral portions mounted in spaced relation to each other, each wheel having a peripheral fruit receiving pocket, a member rotatable about an axis at substantially right angles to those of said feed wheels and having a pair of annular fruit pressing sections, each section being so positioned relative to one of the feed wheels that it passes within the peripheral pocket of said feed wheel and cooperates therewith to effect a pressing action on the fruit, means for feeding fruit to said wheels and member, said means comprising an inclined trough having its lower end terminating between the feed wheels, a disc knife rotatably mounted in the center and adjacent the lower end of the trough, whereby the fruit will be cut in half as it leaves the trough, and a pair of oppositely inclined plates mounted at the lower end of the trough below the disc knife, each plate adapted to guide a fruit half to the pocket of its respective feed wheel.

14. A fruit juice extracting apparatus comprising a pair of aligned feed wheels having their peripheral portions mounted in spaced relation to each other, each wheel having a peripheral fruit receiving pocket, a member rotatable about an axis at substantially right angles to those of said feed wheels and having a pair of annular fruit pressing sections, each section being so positioned relative to one of the feed wheels that it passes within the peripheral pocket of said feed wheel and cooperates therewith to effect a pressing action on the fruit, means for feeding and severing fruit into halves whereby each half will be guided to the peripheral pocket of one of the feed wheels, a casing surrounding the fruit severing means, and means for removing the peel oil laden air from the casing to thereby prevent its escape to the feed wheels and member.

15. A fruit juice extracting apparatus comprising a pair of aligned feed wheels having their peripheral portions mounted in spaced relation to each other, each wheel having a peripheral fruit receiving pocket, a member rotatable about an axis at substantially right angles to those of said feed wheels and having a pair of annular fruit pressing sections, each section being so positioned relative to one of the feed wheels that it passes within the peripheral pocket of said feed wheel and cooperates therewith to effect a pressing action on the fruit, means for feeding fruit to the feed wheels, a disc knife rotatably mounted adjacent the lower end of the feeding means to sever the fruit into halves, with each half being fed to one of the feed wheels, a casing enclosing the disc knife, and means for exhausting peel oil laden air from said casing to thereby prevent its escape to the feed wheels and member.

16. A feed wheel for a fruit juice extracting apparatus having a continuous concave periphery constituting a fruit receiving pocket, said pocket being provided with a plurality of fruit impaling studs to assist in positioning and retaining a half fruit in the pocket with the open face of the fruit exposed, said pocket being provided with a centrally disposed continuous groove free of said studs, and a skin ejecting finger having its free end positioned in said groove for removing the juice extracted skins from the feed wheel.

17. A fruit juice extracting apparatus comprising a pair of aligned feed wheels having their peripheral portions mounted in spaced relation to each other, each wheel having a continuous concave periphery constituting a pocket for the reception of halves of citrus fruit, a member rotatable about an axis at substantially right angles to those of said feed wheels and having a pair of spaced annular fruit pressing sections, each section being of substantially semi-circular formation in cross-section, with the open portions of said sections facing each other, each section passing within the concave periphery of one of the feed wheels during rotation of said wheels and member and cooperating therewith to press the fruit, said annular fruit pressing sections having perforations to permit discharge of the juice therethrough and through the opening formed by the spacing of said sections, each fruit pressing section being provided with spaced inclined vanes extending from side to side of the section and constituting elements for reinforcing said section and for facilitating the discharge of the extracted juice from between said sections.

18. A fruit juice extracting apparatus comprising a feed wheel having a continuous peripheral fruit receiving pocket, and a rotatable member of wheel-like formation rotatable about an axis disposed at an angle to the axis of the feed wheel and having an annular fruit pressing section of substantially semi-circular formation in cross section, said fruit pressing section projecting into the pocket of the feed wheel and having perforations formed therein for the discharge of the juice extracted by the co-action of the feed wheel and member.

19. A fruit juice extracting apparatus comprising a feed wheel having a continuous peripheral fruit receiving pocket, and a rotatable member of wheel-like formation rotatable about an axis disposed at an angle to the axis of the feed wheel and having an annular fruit pressing section projecting laterally from the plane of the member and formed of sheet-like material, said fruit pressing section projecting into the pocket of the feed wheel and having perforations formed therein for the discharge of juice extracted by the coaction of the feed wheel and member.

20. A fruit juice extracting apparatus comprising a feed wheel having a continuous concave periphery constituting a pocket for the reception of halves of citrus fruit, a member rotatable about an axis disposed at an angle to the axis of the feed wheel, said member having an annular fruit pressing section passing within the concave periphery of the feed wheel during rotation of said wheel and member and cooperating therewith to press the fruit, said annular fruit pressing section having perforations for the discharge of juice extracted by the coaction of said wheel and member, and a curved plate movably mounted below the fruit pressing area of said wheel and member and having a raised perforated portion projecting into the concave peripheral portion of the feed wheel and cooperating therewith to effect a final pressing operation on the fruit halves.

21. A fruit juice extracting apparatus comprising a pair of aligned feed wheels having their peripheral portions mounted in spaced relation to each other, each wheel having a peripheral fruit receiving pocket, and means cooperating with said feed wheels to effect a juice pressing action, said means including a pair of fruit pressing sections passing between the wheels, with each section being so positioned relative to one of the feed wheels that it passes within the peripheral pocket of said feed wheel and cooperates therewith to effect a pressing action on the fruit.

HARRY PHILIP BINGENHEIMER.